J. F. DIERDORFF.
DISINTEGRATOR.
APPLICATION FILED JAN. 23, 1911.
1,126,416.
Patented Jan. 26, 1915.
5 SHEETS—SHEET 1.
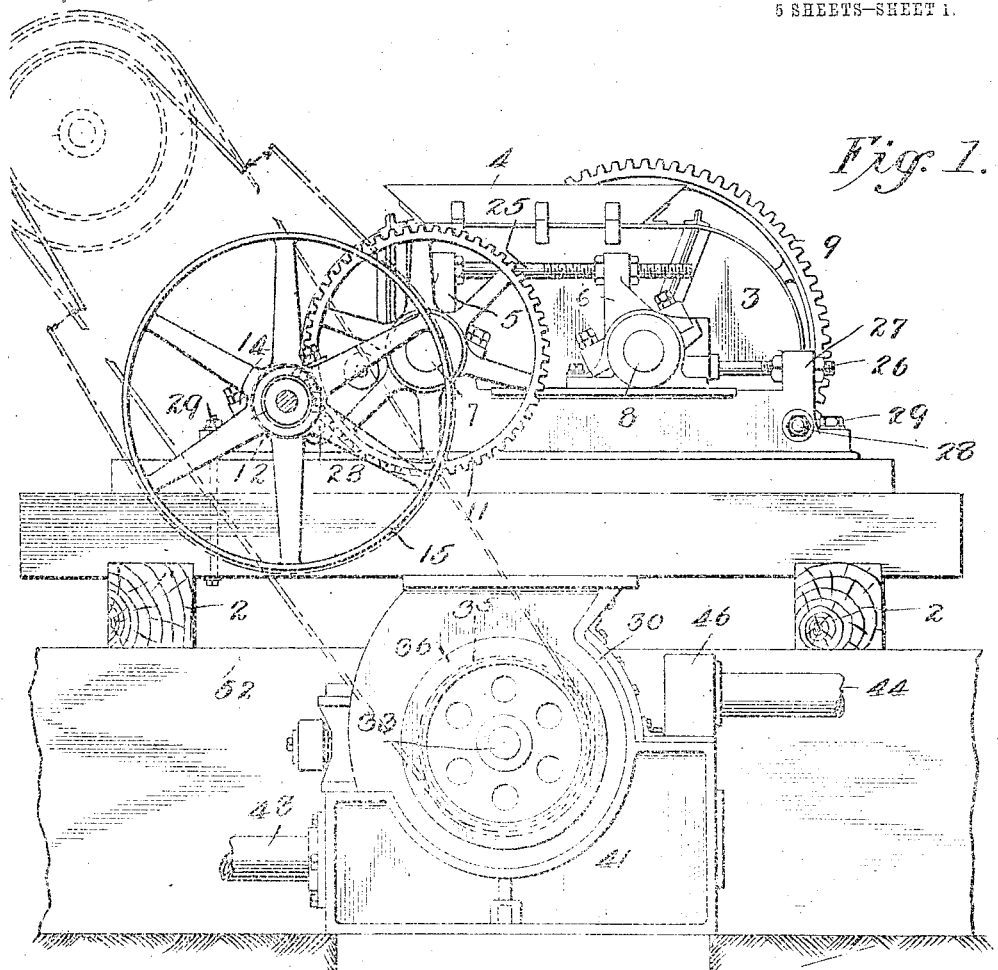
Fig. 1.
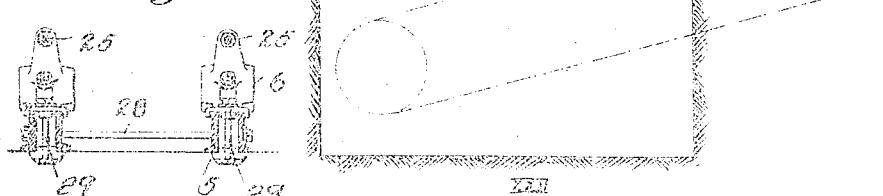
Fig. 22.
Fig. 21.
Witnesses
Jo. F. Bellis
S. Jay Teller
Inventor
Joseph F. Dierdorff
By H. H. Bliss
Attorney

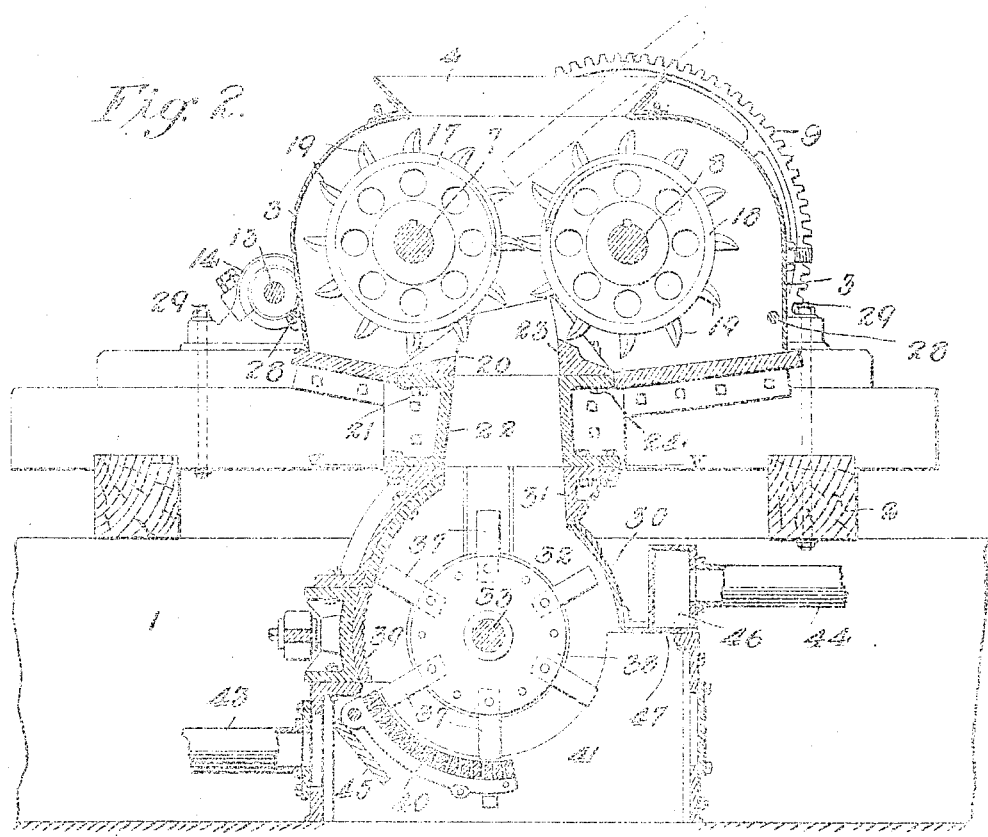
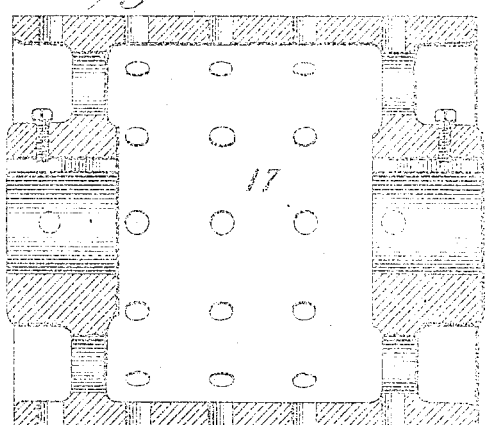
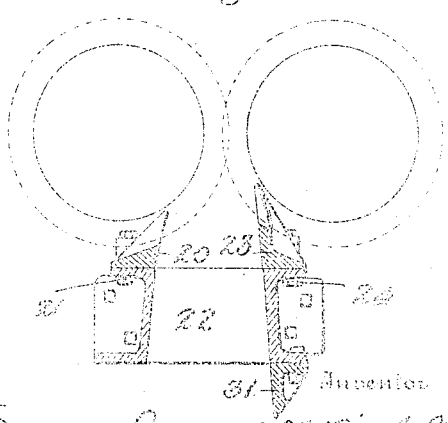

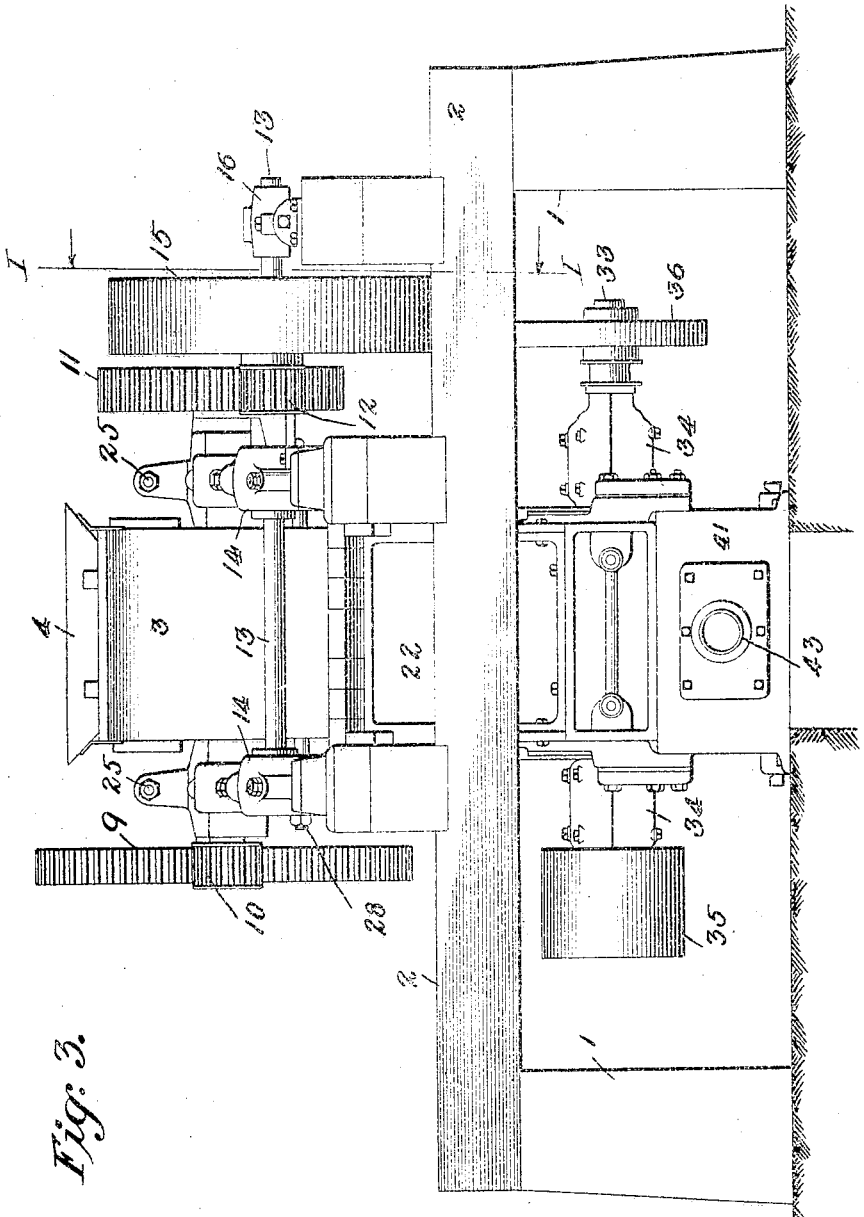

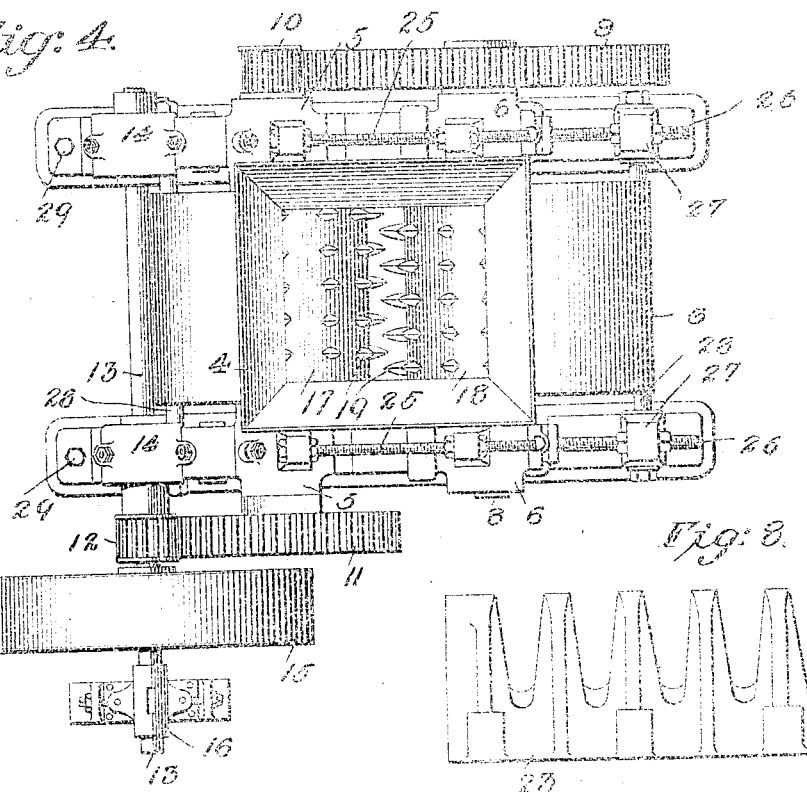

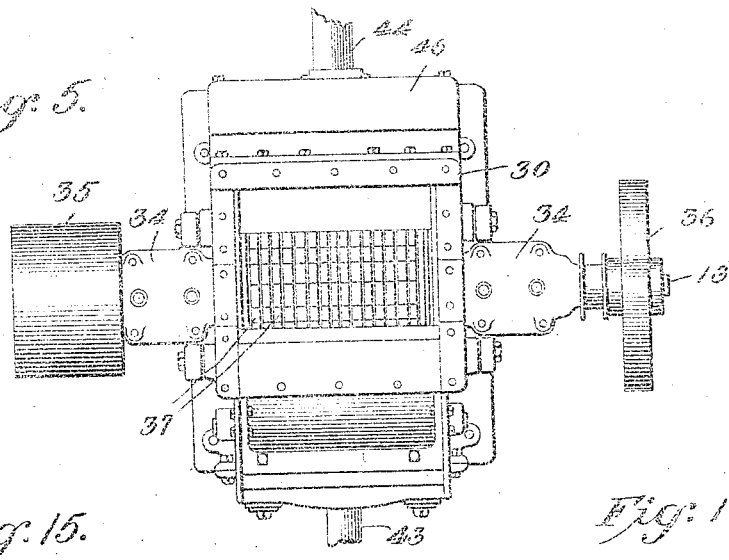
Fig. 5.
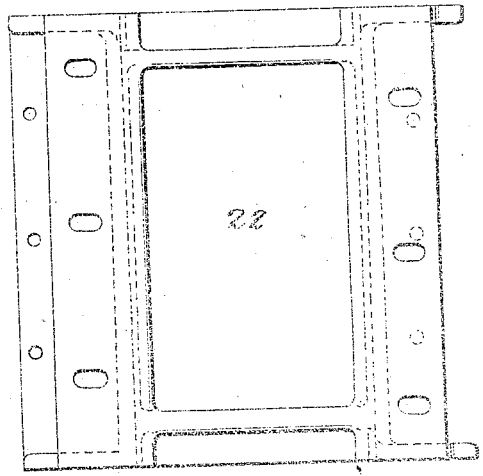
Fig. 15.
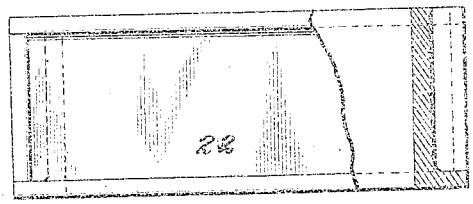
Fig. 17.
Fig. 11.
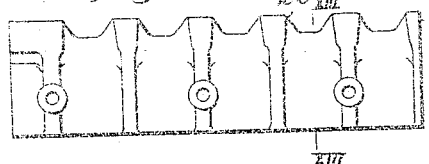
Fig. 12.
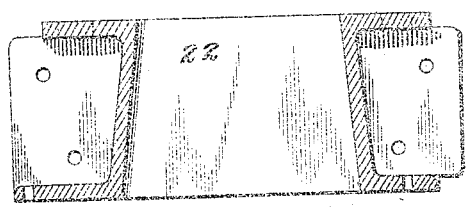
Fig. 16.
Fig. 13.

UNITED STATES PATENT OFFICE.

JOSEPH F. DIERDORFF, OF COLUMBUS, OHIO, ASSIGNOR TO THE JEFFREY MANUFACTURING COMPANY, A CORPORATION OF OHIO.

DISINTEGRATOR.

1,126,416.   Specification of Letters Patent.   Patented Jan. 26, 1915.

Application filed January 23, 1911. Serial No. 604,175.

*To all whom it may concern:*

Be it known that I, JOSEPH F. DIERDORFF, a citizen of the United States, residing at Columbus, in the county of Franklin and State of Ohio, have invented certain new and useful Improvements in Disintegrators, of which the following is a specification, reference being had therein to the accompanying drawing.

This invention relates to improvements in mechanism which is especially adapted for the treatment of paper pulp.

In the manufacture of paper from wood fiber two processes are used for reducing the wood to a pulp. By one process the wood is ground mechanically and by the other process it is treated by a suitable chemical usually at a high temperature. In either case the result is the formation of a more or less liquid pulp, the solid part of which is made up of separated wood fibers.

After the pulp has been made it may then be passed directly to a paper mill if the mill is so located as to make this possible. In many cases, however, either on account of the distance between the pulp and the paper mills, or on account of excess of capacity of the pulp mill over the paper mill, it becomes necessary to reduce the pulp to a condition in which it can be conveniently stored and shipped. This is done by means of what is known as a "wet press" machine. The pulp comes from the wet press machine in sheets resembling heavy wet blotting paper. These sheets are then folded into what are known as pulp laps. These laps are usually about eighteen inches by twenty-four inches in size, and from two to six inches thick. When the laps are first received from the wet press machine they contain about sixty-five per cent. water and are known as wet laps. The laps are sometimes shipped to the paper mills in this condition but are more usually pressed in a hydraulic press and baled. They are then known as hydraulic or repressed laps and contain about fifty per cent. water. It will be apparent that the pulp laps will reach the paper mill in a variety of conditions. Some of the laps on account of exposure to the sun will be very hard and dry, others will be wet and in much the same condition as when first received from the wet press machine. Other laps, especially in winter, will be frozen. The problem presented to the paper mill is to reduce these laps in various conditions to a uniform liquid pulp which will be adapted for treatment by the "beaters" which are devices adapted for causing a thorough assimilation of water by the individual fibers and for producing an intimate mixture with the pulp of the coloring matter, sizing, etc., which are added at this stage of the process. Heretofore the usual practice in treating the laps has been to subject them to the action of a preliminary breaker into which they are fed by hand after being first unfolded. The operation of these preliminary breakers is not however as a rule satisfactory as their action is not continuous and after being filled feeding must be stopped until after the pulp contained in the machine has been properly reduced.

My present invention has for its object to provide a machine, to take the place of these preliminary breakers, which will rapidly, continuously and effectively reduce the pulp laps, without unfolding, to small particles adapted to be fed to and to be acted upon by the beaters.

In the accompanying drawings I have illustrated the form of my invention which I at present deem preferable.

Of the drawings, Figure 1 is an end elevation of a machine embodying my invention. Fig. 2 is a cross sectional elevation of parts of the mechanism shown in Fig. 1. Fig. 3 is a side elevation. Fig. 4 is a plan view. Fig. 5 is a partial plan view showing the parts below the line V—V of Fig. 2. Fig. 6 is a cross sectional view through one of the drums at the upper end of the machine. Fig. 7 shows in detail one of the teeth for the drum shown in Fig. 6. Fig. 8 is a side elevation of the cleaner for one of the toothed cylinders. Fig. 9 is a plan view of the cleaner shown in Fig. 8. Fig. 10 is a cross sectional view through the line X—X of Fig. 9. Fig. 11 is a side elevation of the cleaner for the other toothed cylinder. Fig. 12 is a plan view of the cleaner shown in Fig. 11. Fig. 13 is a cross sectional view through the line XIII—XIII of Fig. 12. Fig. 14 is a partial diagrammatic cross sectional view showing the relation of the cleaners to the toothed cylinders. Fig. 15 is a plan view of the connecting casting between the upper and lower parts of the machine. Fig.

16 is a cross sectional view of the casting shown in Fig. 15. Fig. 17 is a side elevation partly in cross section of the casting shown in Figs. 15 and 16. Fig. 18 is a plan view of the casting which is connected to the bottom of the casting shown in Figs. 15 to 17. Fig. 19 is a side elevation of the parts shown in Fig. 18. Fig. 20 is a cross sectional view along the line XX—XX of Fig. 19. Fig. 21 is a view showing the frame for the upper part of the machine with the casing and the rotating parts removed. Fig. 22 is a cross sectional view along the line XXII—XXII of Fig. 21.

Referring to the drawings, 1, 1, represent piers upon which is mounted the framework or platform 2.

Mounted upon the framework or platform 2, is a casing 3, which is provided at its top with a hopper-like feed opening 4.

Mounted in suitable bearings 5, 5, and 6, 6, are two rotatable shafts 7 and 8, which extend horizontally through the casing 3. The shafts 7 and 8 are connected together at one end by means of a large spur gear 9 on one of the shafts, as for instance 8, and a pinion 10 on the other shaft in engagement with the gear. The other end of the shaft 7 carries the spur gear 11 which meshes with a pinion 12 on the shaft 13.

The shaft 13 is mounted in suitable bearings 14, 14, which are secured to the main frame of the machine.

15 is a belt wheel on the shaft 13. If desired a supplemental bearing 16 may be provided for the shaft 13 at a point outside of the belt wheel.

17 and 18 are cylinders or rolls keyed or otherwise secured to the shafts 7 and 8. These rolls are provided with a series of radial apertures preferably arranged in rows, the rows on one cylinder being staggered relative to those on the other. Into these apertures are inserted, preferably with drive fits, teeth 19 such as shown in detail in Fig. 7. Each tooth is square at its base and has two perpendicular sides which meet in a perpendicular cutting edge. The other two sides of the tooth are rounded off to meet the perpendicular cutting edge and form a sharp tearing point. It will be observed that the cutting edge of the teeth on the cylinder 17, which rotates faster than the cylinder 18, face in the direction of rotation of the cylinder. The teeth on the slower cylinder 18 face in a direction opposite to the direction of rotation of the cylinder.

20 is a cleaner for the roll 17. As is clearly indicated in Figs. 11 to 13, this cleaner comprises a series of spaced fingers adapted to extend between the teeth to points closely adjacent the surface of the roll. This cleaner is adjustably held in position by means of bolts 21 which extend through slotted holes in the connecting casting 22 which will be more fully described hereinafter. 23 is a cleaner for the roll 18 and is similar to the cleaner 20 with the exception that its fingers are longer and co-act with the roll at a higher point. It is also adjustably secured to the connecting casting 22, bolts 24 being used which extend through slotted apertures in the casting.

I have found in practice that it is ordinarily desirable that the minimum distance between the surfaces of the two rolls 17 and 18 be approximately equal to the thickness of the lap which is to be treated. As the laps vary considerably at different places and from time to time, I have provided means for adjusting the relative position of the rolls to vary this minimum distance between them.

The bearings 6, 6, are slidable on the machine frame and their movement is controlled by means of nuts on the threaded rods 25, 25, and 26, 26. The rods 25, 25, are secured at one end to bosses on the bearings 5, 5. The rods 26, 26, are secured at one end to the slidable bearings 6, 6, and their other ends are slidable in bosses 27, 27, on the main frame. Tie bolts 28, 28, connect the two parts of the main frame. By means of the nuts and the threaded rods which have been described the roll 18 may be moved to any desired position relative to the roll 17. After adjustment the bearings are clamped down by means of bolts 29, 29. After the position of the roll has been adjusted it will of course be necessary to provide another gear 9 of suitable diameter to permit it to properly mesh with the pinion 10.

It will be observed that the tie rods 25, 25, serve not only to adjust the positions of the bearings 6, 6, but also serve to securely tie them to the bearings 5, 5, to prevent the bearings being forced apart by an unusually thick lap being fed between the rolls. 30 represents a casing positioned below the mechanism which I have already described and having a feed opening at its top which registers with the opening through the connecting casting 22.

31 is a filler plate connected with the casting 22 and serving to provide a continuation of the surface of the passage through the connecting piece.

32 represents as a whole a rotary hammer mechanism which is mounted within the casing 30 upon the shaft 33 which is in turn mounted in suitable bearings 34, 34, and is driven by means of a belt wheel 35. If desired a balance wheel 36 may be provided at the other end of the shaft 33.

37, 37, represent hammers which are pivotally connected between disks 38 which are connected to the shaft in spaced relation to each other.

The casing 30 is provided at one side with a toothed grinding concave 39 which is adapted to coöperate with the hammers 37, 37. This grinding surface may, if desired, be made radially adjustable.

40 is a grate also adapted to coöperate with the hammers 37, 37. This is located beyond the grinding concave 39 and serves the double function of a grate and of a supplemental grinding concave. Beyond the grate 40 is a free space through which material which has been acted upon by the hammers can be discharged.

As indicated in Figs. 1 and 2, the casing 30 is provided with a lower box-like part 41. The bottom of this box-like part 41 is left open, and may communicate directly, as shown in Fig. 1 with a mixing tank which is indicated by 42. When the mixing tank is thus located immediately beneath the machine, water supply pipes 43 and 44 are preferably provided. The pipe 43 communicates directly with the box 41, a baffle-plate 45 being provided to prevent the passage of the water against the grate 40. The pipe 44 communicates with the box 41 through a distributing chamber 46 which extends entirely across the box and is provided with a narrow slot 47 which permits a narrow sheet of water to drop into the box 41 and into the mixing tank 42. It will be observed that the material thrown out by the hammers 37 after being pulverized is at once intermingled with the sheet of water falling from the slot 47. In this way the pulp is thoroughly and quickly wetted preparatory to further treatment in the mixing tank and by the beaters.

In cases in which it is not found convenient or practicable to locate the mixing tank immediately beneath the machine, an endless belt conveyer can be provided for carrying the shredded pulp to any convenient point. In Fig. 1, I have diagrammatically indicated a part of such a conveyer by means of dotted lines.

Only a very brief statement of the operation of my improved mechanism will be necessary. The folded laps are fed into the machine in the position indicated by dotted lines in Fig. 2. The lap itself engages the teeth of the relatively slowly revolving roll 18 which prevent its being drawn between the rolls too rapidly by the teeth on the relatively rapidly revolving roll 17. The teeth on the roll 17, instead of dragging the lap as a whole between the rollers, merely act to tear off pieces from the lap as it is moved forward relatively slowly under the control of the teeth on the roll 18. The pieces which are torn off are thrown down with some violence into the pulverizing mechanism below, through the expanding passageway which has been described. It is to be noted that the divergence of the walls of this passageway makes it impossible for it to become choked by a mass of pieces forming an arch or bridge. The cleaners 20 and 23 serve to prevent any pieces of lap becoming wedged between the teeth in such a way as to be carried entirely around by the rolls as they rotate. As has been before pointed out the rolls are smooth and cylindrical. This facilitates the cleaning operation, as there are no grooves or crevices in which the pieces of lap can become lodged. As has been stated, it is desirable that the distance between the surfaces of the two rolls 17 and 18 be substantially the same as the thickness of the laps which are to be shredded. This can be accomplished in the manner which has been pointed out by means of the threaded adjusting rods 25, 25 and 26, 26 which serve to move the bearings upon which the roller 18 is mounted. It will, of course, be understood that for each position of the roller 18 a gear 9 of proper diameter to mesh with the pinion 10 must be provided. It is to be observed in this connection that when the roll 18 is moved to accommodate the machine for laps of greater thicknesses, this roll is driven at a lower speed on account of the larger gear 9 which must be used. If it be assumed that the speed of the roll 17 remains unchanged then the slower speed of the roll 18 will permit the thicker lap to be fed only at a slower rate, more time being thus given for the teeth of the roll 17 to act upon it. The pieces of laps thrown down from the preliminary tearing mechanism are caught by the rapidly revolving hammers 37 within the casing 30. These hammers serve to grind the pulp pieces against the toothed surface 39 and against the grate 40. Some of the resultant shredded particles drop through the grate 40 into the mixing tank while other particles are discharged through the opening beyond the grate 40, where they are mingled with the water from the slot 47 and thoroughly wetted as before described.

It is, of course, desirable that the two parts of this machine be driven in proper timed relation with each other. One convenient way of doing this is indicated in Fig. 1 which shows a power shaft 48 carrying belt pulleys 49 and 50. A belt 51 serves to drive the upper part of the mechanism by means of the belt pulley 15, and a belt 52 serves to drive the lower part of the mechanism by means of the belt pulley 35.

What I claim is:—

1. The combination in a pulp lap shredder of a primary disintegrating mechanism, comprising a rotatable roll, circumferentially spaced teeth on the roll having sharp points and radial cutting edges, the teeth following each other in rapid succession to pierce the laps and cut and tear relatively large pieces therefrom, a duct for receiving the said large pieces from the said primary mechanism, and a secondary mechanism arranged to receive the said large pieces from the duct and disintegrate them into very small pieces.

2. The combination in a pulp lap shredder of a primary disintegrating mechanism, comprising a rotatable roll, circumferentially spaced teeth on the roll having sharp points and radial cutting edges, the teeth following each other in rapid succession to pierce the laps and cut and tear relatively large pieces therefrom and forcibly discharge them, a straight duct positioned along the lines of discharge of the said large pieces for receiving them from the said primary mechanism, and a secondary mechanism arranged to receive the said large pieces from the duct and disintegrate them into very small pieces.

3. The combination in a pulp lap shredder of two adjacent parallel rolls, means for rotating the rolls at different speeds and in directions such that the laps will be caught and carried downward between them, teeth on the slower moving roll having backward directed radial cutting edges, teeth on the faster moving roll having forward directed radial cutting edges, the different relative speeds of the rolls causing the said sets of teeth to oppose each other and tear the laps into relatively large pieces, a duct arranged to receive the said large pieces from the said rolls and teeth, and a mechanism located at the opposite end of the said duct for disintegrating and shredding the said large pieces discharged through the said duct.

4. In an apparatus for disintegrating pulp laps, the combination of a primary mechanism having devices for engaging a lap and separating relatively large pieces therefrom, a duct for receiving the said large pieces from the primary mechanism, a secondary mechanism, arranged to receive the said large pieces from the duct and disintegrate them into very small pieces, and means for supplying a sheet of water in the path of the small pieces discharged from the secondary mechanism.

5. In a device of the class described, the combination of two parallel adjacent toothed rolls, means for rotating the rolls at different speeds and in directions such that material will be caught and carried downward between them, the different relative speeds of the rolls causing the teeth thereof to tear and disintegrate material so caught, a downward extending duct arranged to receive torn material from the said toothed rolls, and a mechanism located at the lower end of said duct for disintegrating and shredding pieces of material discharged from the toothed rolls through the said duct.

6. In a device of the class described, the combination of two parallel adjacent toothed rolls arranged to rotate at different speeds in directions to carry material downward between them, the different relative speeds causing the teeth of the rolls to tear apart material thus carried downward, a downward extending duct arranged to receive material from the rolls, the said duct having downward diverging walls, and a mechanism positioned at the lower end of the duct for receiving pieces of material therefrom and further disintegrating and shredding them.

7. In a mechanism of the character described, the combination of two parallel adjacent toothed rolls, means for rotating the rolls at different speeds in directions to carry material downward between them, cleaners for each roll, each cleaner having teeth spaced and positioned to extend between the teeth of the rolls to prevent pieces of material from being carried around thereby, a downward extending duct for pieces of material discharged from the rolls, and mechanism at the lower end of the duct for further treating the said pieces of material discharged from the rolls through the duct.

8. In a mechanism of the class described, the combination of two parallel adjacent smooth cylinders, teeth on the cylinders arranged in circumferential rows, the rows of the two cylinders being staggered relative to each other, cleaners for the cylinders, each having fingers spaced and positioned to extend between the rows of teeth to points closely adjacent the smooth surface of the cylinder, the said teeth serving to dislodge pieces of material from between the teeth to prevent their being carried around the cylinder, a duct for receiving the pieces of material discharged from the cylinders, and mechanism at the lower end of the duct for receiving and treating the pieces of material discharged through the duct.

9. In a mechanism of the class described, the combination of two parallel adjacent smooth cylinders, means for rotating the cylinders at different speeds in directions to carry material downward between them, teeth on the cylinders arranged in circumferential rows, the rows of the two cylinders being staggered relative to each other, a cleaner for the more rapidly rotating cylinder having fingers spaced and positioned to extend between the teeth of the cylinder to dislodge pieces of material from between them, a similar cleaner for the less rapidly rotating cylinder, the said cleaner having fingers spaced and positioned to extend between the teeth of the cylinder to dislodge particles of material from between them, the fingers of the said cleaner for the less rapidly rotating cylinder engaging the pieces of material at points higher than the points of engagement of the fingers of the cleaner for the more rapidly rotating cylinder, a downward extending duct for pieces discharged from the cylinders, and a mechanism at the lower end of the duct for receiving and treating pieces of material discharged through it.

10. In a mechanism of the class described, the combination of two parallel adjacent rolls, means for rotating the rolls at different speeds in directions to carry material downward between them, teeth arranged on the rolls in circumferential rows, each tooth having a substantially radial cutting edge, and the rows of teeth on the two rolls being staggered relative to each other, the cutting edges of the teeth on the rapidly rotating roll being in advance and the cutting edges of the teeth on the less rapidly rotating roll being behind whereby shearing and tearing action is obtained between the two sets of teeth, a downward extending duct for receiving material discharged from the rolls, and means at the lower end of the duct for receiving and treating material discharged therethrough.

In testimony whereof I affix my signature, as in presence of two witnesses.

JOSEPH F. DIERDORFF.

Witnesses:
O. T. DENUNE,
DUDLEY T. FISHER.